(12) United States Patent
Liu et al.

(10) Patent No.: US 8,552,660 B2
(45) Date of Patent: Oct. 8, 2013

(54) DRIVE CIRCUIT FOR PARALLEL ARRAY OF LIGHT EMITTING DIODES

(76) Inventors: Zutao Liu, ZiZhu Science Park (CN);
Kun Cheng, ZiZhu Science Park (CN);
Jianbo Sun, ZiZhu Science Park (CN);
Gang Shi, ZiZhu Science Park (CN)

( * ) Notice: Subject to any disclaimer, the term of this patent is extended or adjusted under 35 U.S.C. 154(b) by 224 days.

(21) Appl. No.: 12/777,079

(22) Filed: May 10, 2010

(65) Prior Publication Data
US 2011/0215727 A1 Sep. 8, 2011

(51) Int. Cl.
*H05B 37/02* (2006.01)
(52) U.S. Cl.
USPC ........ 315/291; 315/209 R; 315/294; 315/297; 330/9; 327/124
(58) Field of Classification Search
USPC ............. 315/291, 299, 307, 209 R, 294, 297, 315/312, 308; 330/9; 327/124
See application file for complete search history.

(56) References Cited

U.S. PATENT DOCUMENTS

| 4,931,745 A * | 6/1990 | Goff et al. .......................... 330/9 |
| 2007/0236285 A1* | 10/2007 | Felder ................................ 330/9 |
| 2009/0284242 A1* | 11/2009 | Motz .............................. 323/313 |
| 2011/0215727 A1* | 9/2011 | Liu et al. ........................ 315/210 |

* cited by examiner

*Primary Examiner* — Douglas W Owens
*Assistant Examiner* — Jonathan Cooper

(57) ABSTRACT

The present invention relates to a parallel light emitting diode ("LED") drive circuit and provides a drive circuit configured to drive a parallel array of LEDs. The drive circuit comprises: a plurality of switches, a plurality of sampling resistors, and a plurality of chopper amplifiers. Each switch is coupled to a respective LED in the LED array. Each chopper operational amplifier configured to receive a reference voltage and a switching control signal and generate an input offset voltage. Each chopper operational amplifier includes a differential amplifier including an input transistor pair and a current mirror transistor pair, of which the electrical positions can be reserved when the switching control signal is switched between a first state and a second state, wherein the offset voltage, which causes the lightness mismatching in a parallel LED circuit, can be cancelled.

11 Claims, 3 Drawing Sheets

DRIVE CIRCUIT FOR PARALLEL ARRAY OF LIGHT EMITTING DIODES

CROSS-REFERENCE TO RELATED APPLICATIONS

This application claims the benefit of Chinese utility model patent applications Serial No. 201020128193.6 filed on Mar. 8, 2010 and entitled "A Parallel Light Emitting Diode (LED) Drive Circuit" and Serial No. 201020128299.6 filed on Mar. 8, 2010 and entitled "A Parallel Lighting Emitting Diode (LED) Drive Circuit", which are incorporated herein be reference.

FIELD OF THE INVENTION

The present invention generally relates to a drive circuit for a parallel array of light emitting diodes (LEDs).

BACKGROUND OF THE INVENTION

Light-Emitting Diodes ("LEDs") are semiconductor light sources. With the development of high efficiency and high power LEDs, LEDs have been widely used for lighting and illumination sources. While monochrome displays can use colored light sources, such as electroluminescent back lights or colored LEDs, color displays still require a white LED as a light source to properly display color.

Using LEDs for illuminations has a wide rage of applications, such as backlighting for Liquid Crystal Display (LCD) in handheld devices (e.g. cell phone, MP3, MP4, GPS, PDAs, digital cameras, etc.), backlighting for notebook computer displays, backlighting for LCD televisions, and the like.

There are two main methods for providing a white light source: white LEDs and Cold Cathode Fluorescent Lamps ("CCFLs"). CCFLs have been used for years in notebook computer display and Televisions. However, comparing the CCFL, the advantages of using LED array as the LCD backlight source lies in, for example, high brightness, high contract ratio, fast reaction rate, wide color range, lower power consumption, long life-span, and reduced environmental pollution, to name but a few. Therefore, LEDs are becoming the preferred light source for in a variety of applications from consumer devices to industrial lighting.

There are several methods of backlighting an LCD panel using multiple LEDs or LED arrays, such as positioning white LED arrays behind the LCD panel or using Edged-LED lighting. Edged-LED lighting uses multiple white LEDs arranged around the inside frame of the display along with a special light diffusion panel designed to spread the light evenly behind the LCD panel.

LED light characteristics are generally described with a function of LED working current. To control the brightness of an LED is to control the working current of the LED. LED circuits can be driven in series or in parallel and they both have their own advantages and disadvantages.

In series connection, multiple LEDs can be connected in series with a single current limiting resistor provided the source voltage is greater than the sum of the individual LED threshold voltages. The disadvantage of series connection is that it requires a higher supply voltage and is not power and energy efficient.

In parallel connection, multiple LEDs can be connected in parallel, but the LEDs must have closely matched forward voltages in order to have equal branch currents and, therefore, generally equal brightness. Variations in the manufacturing process can make it difficult to obtain exactly equal forward voltages and, therefore, equal current or equal brightness when connecting some types of LEDs in parallel.

Therefore, it would be desirable to have a system and method for creating an LED-based lighting system that is efficient and provides a consistent and substantially uniform light and brightness.

SUMMARY OF INVENTION

The present invention overcomes the aforementioned drawbacks by providing a parallel LED drive circuit that reduces variations between drive currents for all LEDs by reducing circuitry variability, such that the drive currents for all LEDs is substantially determined by a sampling resistor, which can be accurately matched throughout the drive circuit.

In accordance with one aspect of the present invention, a drive circuit configured to drive a parallel array of LEDs is provided. The drive circuit includes a plurality of transistors, each configured to be coupled to a respective LED in the parallel array of LEDs and a plurality of sampling resistors, each coupled to a respective transistor in the plurality of transistors and configured to receive a drive current when the respective transistor is in a closed state. The drive circuit also includes a plurality of chopper operational amplifiers, each chopper operational amplifier configured to receive a reference voltage and a switching control signal and generate an input offset voltage configured to control a respective transistor in the plurality of transistors. Each chopper operational amplifier includes a differential amplifier including an input transistor pair and a current mirror transistor pair. The input transistor pair and current mirror transistor pair are mismatched, such that when the switching control signal is switched between a first state and a second state, electrical positions of the input transistor pair switch and electrical positions of the current mirror transistor pair switch to thereby cause a reversing of polarity of the input offset voltage of the chopper operational amplifier.

In accordance with another aspect of the invention, a parallel light emitting diode (LED) lighting system is provided that includes a power source configured to drive the parallel LED lighting system. The lighting system also includes an array of LEDs coupled together in parallel, each LED including an anode coupled to the power source to receive a drive current ($I_{LED}$) and a cathode and a drive circuit having a plurality of sub-circuits each coupled to the cathode of a respective LED in the array of LEDs. The drive circuit includes a sampling resistor having a value R and a drive transistor having a drain, gate, and source, wherein the drain is connected to the respective LED through the cathode and the source is connected to a ground through the sampling resistor. The drive circuit further includes a chopper operational amplifier having an a output terminal coupled to the gate of the drive transistor, a positive feedback input terminal connected to a reference voltage (RV), a negative feedback input terminal connected to the source of the drive transistor, and a control signal input terminal connected to a switching control signal. By way of this configuration, $$I_{LED} = \frac{RV}{R},$$

and thereby the drive current is directly proportional to the value of the switching resistor and not the values of other components in the drive circuit.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Figure 1:
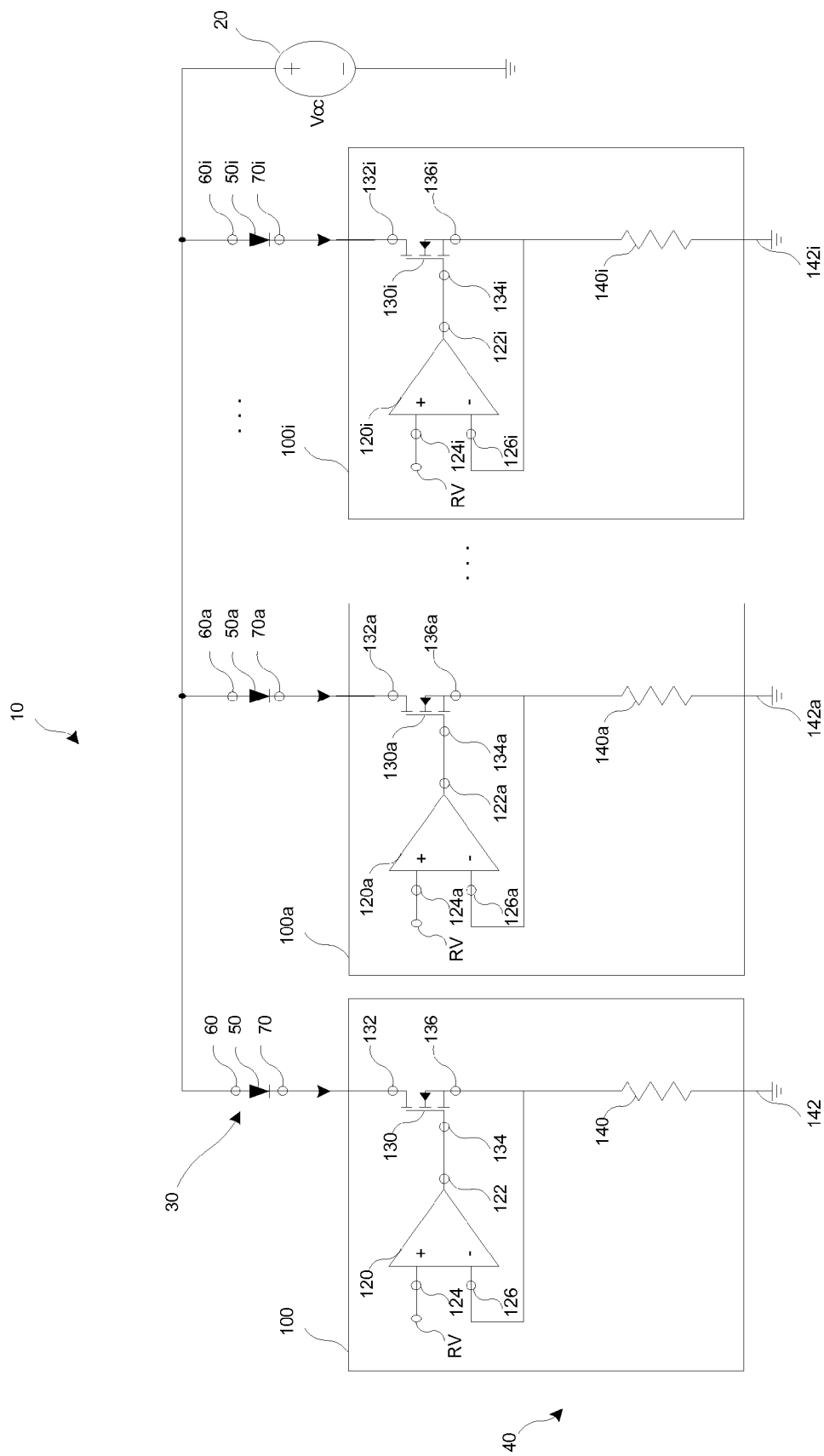
FIG. 1 is a circuit diagram showing a prior art drive circuit for a parallel array of light emitting diodes (LEDs).

FIG. 1 is a circuit diagram showing a light emitting diode (LED) lighting system 10 including a power source 20, an array of LEDs 30, and a traditional drive circuit 40. The array of LEDs 30 includes a plurality of LEDs 50, 50a, 50i, each having respective anodes 60, 60a, 60i and cathodes 70, 70a, 70i. Though, for exemplary purposes, the array of LEDs 30 is shown with three LEDs 50, 50a, 50i, any number of LEDs may be included in the array of LEDs 30. Furthermore, the notation of "i" is intended to indicate the "ith" component and is not representative of an array containing components "a" through "i".

Each LED 50, 50a, 50i is coupled to the power source 20 through the anode 60, 60a, 60i to receive a drive current ($I_{LED}$). Also, each LED 50, 50a, 50i is coupled to the drive circuit 40 through the cathode 70, 70a, 70i. More particularly, each LED 50, 50a, 50i is coupled to a respective drive module 100, 100a, 100i of the drive circuit 40. Since all drive modules 100, 100a, 100i have substantially identical structure, the drive module 100 is discussed as an example representing all drive modules 100, 100a, 100i.

The drive module 100 includes an operational amplifier 120, a switch, such as a transistor 130, and a sampling resistor 140. The cathode terminal 50 of the LED 60 is connected to a drain electrode 132 of the transistor 130. A gate electrode 134 and a source electrode 136 of the transistor 130 are connected to an output terminal 122 of the operational amplifier 120 and the sampling resistor 140, respectively, wherein the sampling resistor 140 is connected to a ground 142. A positive feedback input terminal 124 of the operational amplifier 120 is connected to a reference voltage RV and a negative feedback input terminal 126 of operational amplifier 120 is connected to the source electrode 136 of the transistor 130.

In FIG. 1, the drive current $I_{LED\_i}$ of the ith LED 50i can be obtained when the respective ith transistor 130i is closed and reference voltage RV is input to the respective ith operational amplifier 120i. Without taking into account the input offset voltage of the ith operational amplifier 120i, the drive current of the ith LED 50i in drive circuit 100 can be calculated by equation (1):

$$I_{LED\_i} = RV/R_i \qquad (1);$$

wherein i represents the ith drive module 100i, i=1, 2, ... n; $I_{LED\_i}$ represents the drive current of the ith LED 120i; $R_i$ represents the resistance value of the ith sampling resistor 140i.

Equation (1) shows that, theoretically, without considering the input offset voltage of the operational amplifiers 120, 120a, 120i, the drive currents of all LEDs 50, 50a, 50i can be accurately matched, as long as the physical characteristics, such as the resistance value, of the sampling resistors 140, 140a, 140i are accurately matched.

Due to the presence of an input offset voltage in each operational amplifier 120, 120a, 120i, however, the scenario provided by equation (1) can not be realized in practice. Suppose the input offset voltage of each operational amplifier 120, 120a, 120i is $V_{osi}$, then the actual drive current of each LED 120, 120a, 120i is:

$$I_{LED_i}' = (RV - V_{osi})/R_i \qquad (2);$$

wherein ˥ i=1, 2, ..., n.

Equation (2) shows that when input offset voltage $V_{osi}$ of each operational amplifier 120, 120a, 120i are not matched, even if sampling resistors 140, 140a, 140i of all drive modules 100, 100a, 100i have a very high matching accuracy. Therefore, in practice, it is difficult for the parallel LED drive system 10 to realize the drive current match among all LEDs. Thus, the parallel LED drive circuit 40 according to the prior art offers limited potential in providing matched drive currents for all LEDs and, therefore, a consistent and substantially uniform light and brightness.

Figure 2:
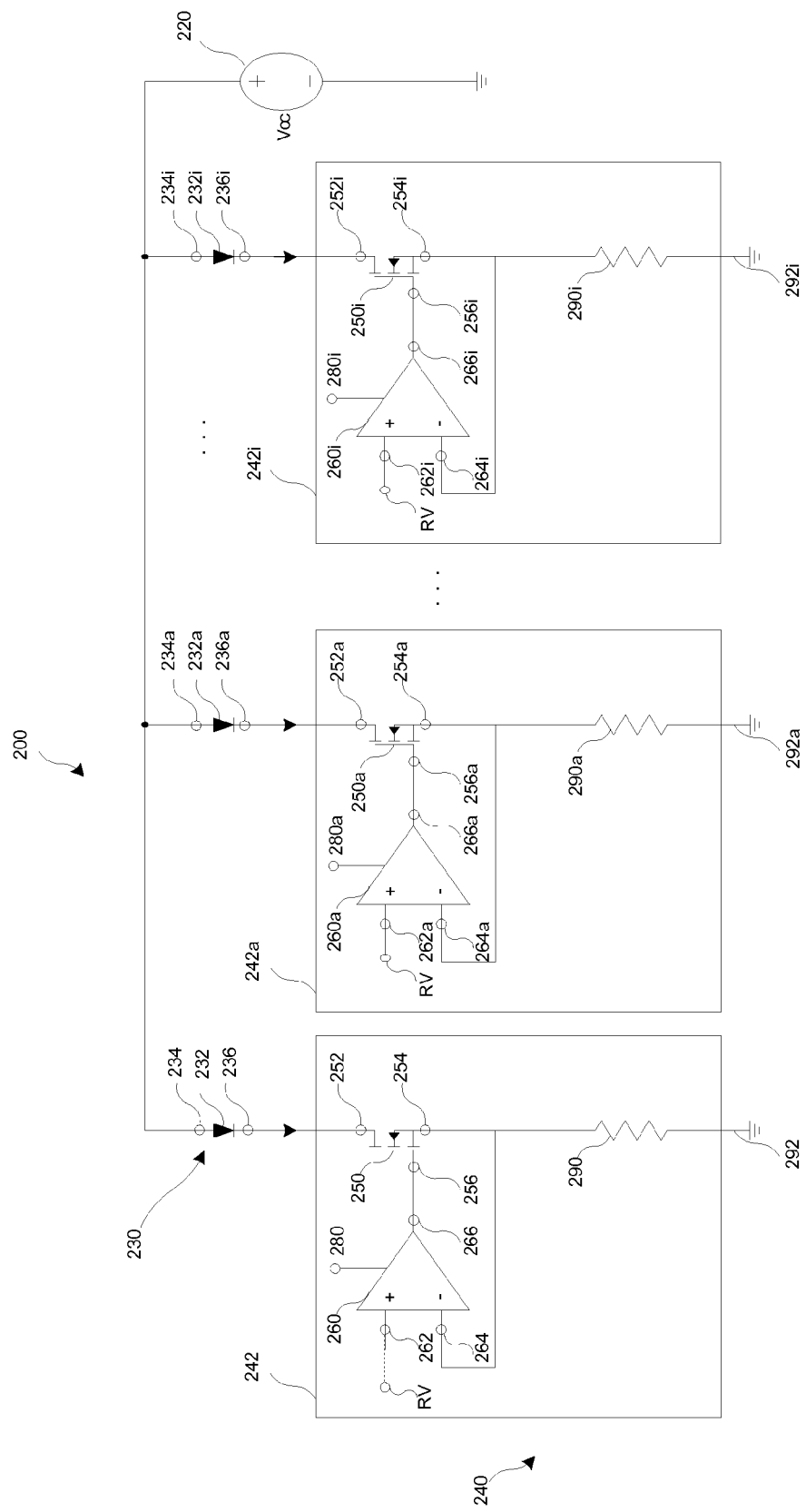
FIG. 2 is a circuit diagram showing a drive circuit for a parallel array of light emitting diodes (LEDs) having a chopper operational amplifier in accordance with the present invention.

FIG. 2 is a circuit diagram showing a light emitting diode (LED) lighting system 200 including a power source 220, an array of LEDs 230, and a drive circuit 240. The array of LEDs 230 includes a plurality of LEDs 232, 232a, 232i, each having respective anodes 234, 234a, 234i and cathodes 236, 236a, 236i. Though, for exemplary purposes, the array of LEDs 320 is shown with three LEDs 232, 232a, 232i, any number of LEDs may be included in the array of LEDs 230. Furthermore, the notation of "i" is intended to indicate the "ith" component and is not representative of an array containing components "a" through "i".

Each LED 232, 232a, 232i is coupled to the power source 220 through the anode 234, 234a, 234i to receive a drive current ($I_{LED}$). Also, each LED 234, 234a, 234i is coupled to the drive circuit 240 through the cathode 236, 236a, 236i. More particularly, each LED 232, 232a, 232i is coupled to a respective drive module 242, 242a, 242i of the drive circuit 240. Since all drive modules 242, 242a, 242i have substantially identical structure, the drive module 242 is discussed as an example representing all drive modules 242, 242a, 242i.

The drive module 242 includes a chopper operational amplifier 260, a switch, such as a transistor 250, and a sampling resistor 290. The cathode terminal 236 of the LED 232 is connected to a drain electrode 252 of the transistor 250. A gate electrode 256 and a source electrode 256 of the transistor 250 are connected to an output terminal 266 of the chopper operational amplifier 260 and the sampling resistor 290, respectively, wherein the sampling resistor 290 is connected to a ground 292. A positive feedback input terminal 262 of the chopper operational amplifier 260 is connected to a reference voltage RV and a negative feedback input terminal 264 of operational amplifier 260 is connected to the source electrode 254 of the transistor 250. A switching control signal terminal 280 of chopper operational amplifier 260 is connected to a switching control signal.

In FIG. 2, the chopper operational amplifier 260 is used to take the place of the operational amplifier 120 in system 10 in FIG. 1. As will be described in detail below, the chopper operational amplifier 260 can include a differential amplifier including an input transistor and a current mirror transistor pair. In the chopper operational amplifier 260, the input transistor pair is connected to the source electrode of respective transistor 250 and reference voltage RV, wherein the input transistor pair can function as the negative and positive feedback input terminal input terminal of chopper operational amplifier 260, respectively. As will be described, the aforementioned current mirror transistor pair can function as the output tube of the first differential amplifier of chopper operational amplifier 260.

The switching control signal can have a 50% duty cycle. For example, within one total working period of the current of the LED 232, the switching control signal is at a first state, such as a high level, within half of the period and at a second state, such as a low level, within the other half thereof. In other words, the switching control signal can be switched once between the first state and the second state within one working period of the current of the LED 232. As will be described in further detail with respect to FIG. 3, when the switching control signal is switched, the electrical positions of the inputs are designed to switch such that the polarity, positive or negative, of the input offset voltage of chopper operational amplifier 260 can be reversed once when the switching signal is switched within one period of the working period of the LED 232. The offset voltage, such as a positive voltage, within the first half of the working period and the reserved offset voltage, a negative voltage, within the other half thereof can cancel each other and the effect of the input offset voltage of the chopper operational amplifier 260 can be eliminated, which result in that the drive current of each LED 232, 232a, 232i in each drive module 242, 242a, 242i is only determined by the reference voltage RV and each sampling resistor 290, 290a, 290i.

The reference voltage RV can be the same for all drive modules. Therefore, the drive current of each LED 232, 232a, 232i can be only determined by the resistance value of the respective sampling resistor 290, 290a, 290i. As long as all the physical characteristics, such as the resistance value, of the sampling resistors 290, 290a, 290i are accurately matched, the drive currents of all LED in each drive module can be accurately matched.

According to common knowledge of semiconductor processes, resistors can have excellent matching accuracy in semiconductor manufacturing. For example, the resistance value mismatching between the same-sized polysilicon resistors can be controlled under 0.1%. Therefore, a good matching of drive currents of all LEDs 232, 232a, 232i can be obtained in the LED lighting system 200 and the matching accuracy can be close to the matching accuracy of resistors.

It is important to note that in order to avoid the LED flickering effect to a user's eyes, in the present invention, the toggle frequency of the switching control signal between the first state and the second state should be higher than 50 Hz.

Figure 3:
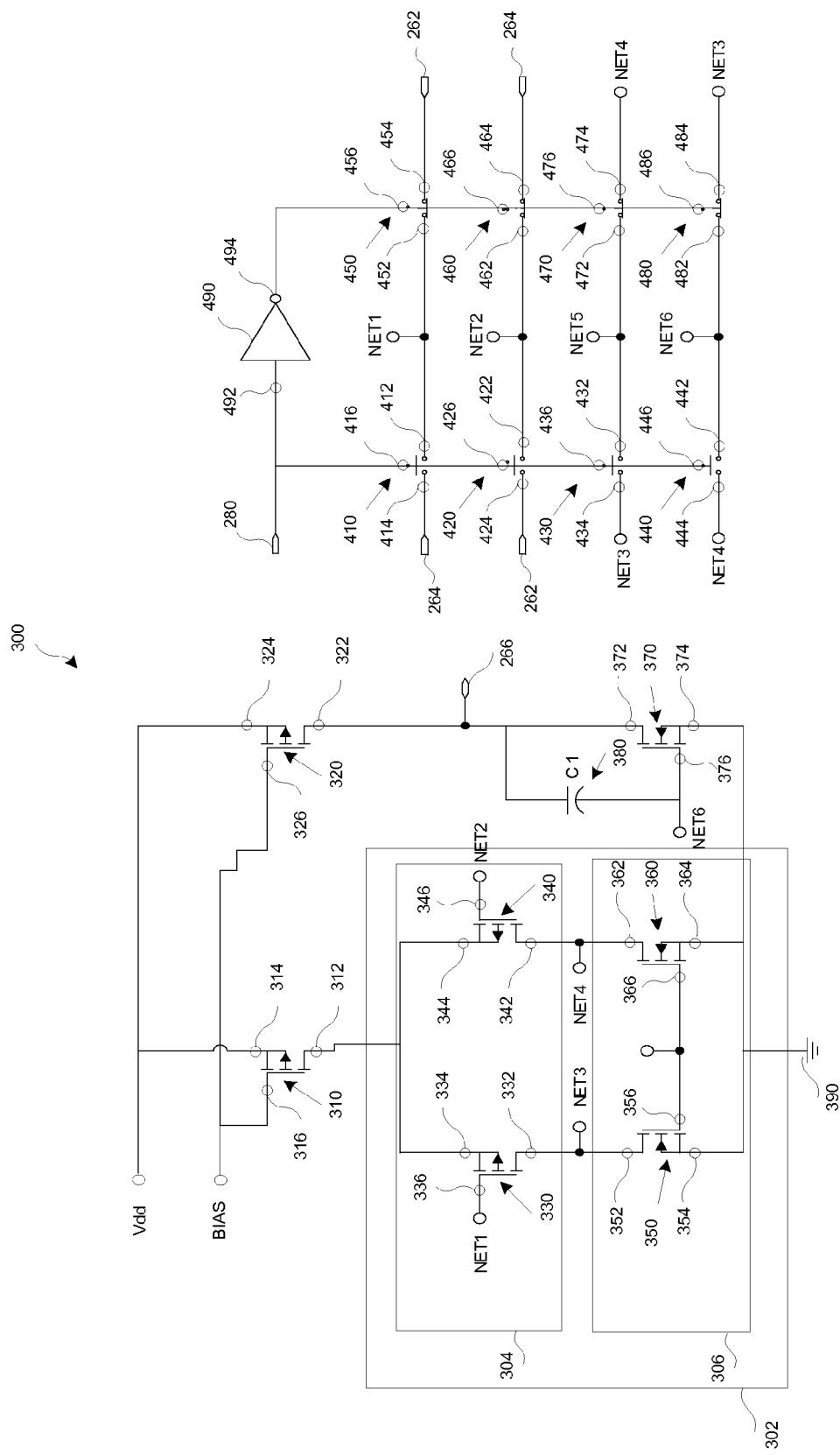
FIG. 3 is a circuit diagram showing a sub-components of the chopper operational amplifier of FIG. 2.

Specifically, FIG. 3 is a circuit diagram showing a subcomponent 300 of the chopper operational amplifier 260 of LED lighting system 200 of FIG. 2. The chopper operational amplifier can be realized through a variety of specific circuit forms. In FIG. 3, one of the specific circuit structures is described in detail as an example. In other embodiments of the present invention, the chopper operational amplifier can have but not limited to the circuit structure shown in FIG. 3. However, regardless of the specific form of the chopper operational amplifier, the chopper operational amplifiers used by all drive modules have substantially identical circuit structure.

In FIG. 3, the subcomponents 300 of the chopper operational amplifier 260 include seven transistors 310, 320, 330, 340, 350, 360, 370, one operational amplifier 490, eight switches 410, 420, 430, 440, 450, 460, 470, 480, and a Miller compensation capacitor 380. The seven transistors include a first transistor 310, a second transistor 320, a third transistor 330, a fourth transistor 340, a fifth transistor 350, a sixth transistor 360 and a seventh transistor 370. The eight switches include a first switch 410, a second switch 420, a third switch 430, a fourth switch 440, a fifth switch 450, a sixth switch 460, a seventh switch 470, and an eighth switch 480.

The first transistor 310 and the second transistor 320 have commonly connected gate electrodes 316, 326, which are both connected to a gate electrode bias voltage BIAS. The first transistor 310 and the second transistor 320 have commonly connected source electrodes 314, 324, which are both connected to a working voltage Vdd. The drain electrode 312 of the first transistor 310 is connected to the source electrode 334 of the third transistor 330 and the source electrode 344 of the fourth transistor 340. The drain electrode 332 of the third transistor 330 is connected to the drain electrode 352 of the fifth transistor 350, which form NET3. The drain electrode 342 of the fourth transistor 340 is connected to the drain electrode 362 of the sixth transistor 360, which form NET4. The gate electrode 356 of the fifth transistor 350 is connected to the gate electrode 366 of the sixth transistor 360, which form NET5. The source electrode 354 of the fifth transistor 350 and the source electrode 364 of the sixth transistor 360 are commonly grounded. The drain electrode 322 of the second transistor 320 is connected to the drain electrode 372 of the seventh transistor 370. The source electrode 374 of the seventh transistor 370 is connected to a ground 390. The Miller compensation capacitor 380 is connected between the drain electrode 372 and the gate electrode of 376 of the seventh transistor 370.

The input terminal 492 of the operational amplifier 490 is connected to the switching control signal and the control terminal 416, 426, 436 and 446 of switch 410, 420, 430, and 440. The output terminal 494 of the operational amplifier 490 is connected to the control terminal 456, 466, 476, and 486 of switch 450, 460, 470, and 480.

The first contact 412 of the first switch 410 is connected to the first contact 452 of the fifth switch 450, and the common terminal NET1 of the two is connected to the gate electrode 336 of the third transistor 330. The first contact 422 of the second switch 420 is connected to the first contact 462 of the sixth switch 460, and the common terminal NET2 of the two is connected to the gate electrode 346 of the fourth transistor 340. The first contact 432 of the third switch 430 is connected to first contact 472 of the seventh switch 470, and the common terminal of the two is connected to the common gate terminal NET5 of the fifth transistor 350 and the sixth transistor 360. The first contact of 442 the fourth switch 440 is connected to the first contact 482 of eighth switch 480, and the common terminal NET6 of the two is connected to the gate electrode 376 of seventh transistor 370.

The second contact 434 of the third switch 430 is connected to the second contact 484 of the eighth switch 480, and the common terminal thereof is connected to the common drain terminal NET3 of the third transistor 313 and the fifth transistor 315. The second contact 444 of the fourth switch 440 is connected to the second contact of 474 of the seventh switch 470, and the common terminal thereof is connected to the common drain terminal NET4 of the fourth transistor 340 and the sixth transistor 360.

The second contact 411 of the first switch 410 and the second contact 464 of the sixth switch 460 is connected and both function as the negative feedback input terminal 264 of the chopper operational amplifier 260. The second contact 424 of the second switch 420 and the second contact 454 of the fifth switch 450 are connected and both function as the positive feedback input terminal 262 of the chopper operational amplifier 260. The drain electrode 372 of the seventh transistor 370 and the drain electrode 322 of the second transistor 320 are connected and can function as the output terminal 266 of the chopper operational amplifier 260.

In the first transistor 310 and second transistor 320 is the bias current mirrors. The third transistor 330 and fourth transistor 340 is the input transistor pair 304. The fifth transistor 350 and the sixth transistor 360 is the current mirror transistor pair 306. The seventh transistor 370 is the output tube.

When the switching control signal is at the first state, all of the switches 321, 322, 323 and 324 is closed and all of the switches 325, 326, 327, and 328 is open. In this situation, NET1, which is the gate electrode 336 of the third transistor 330, is connected to the negative feedback terminal 264 of the chopper operational amplifier 260, which is connected to the source electrode 254 of transistor 250 the 250 in LED lighting system 200. Further, NET2, which is the gate electrode of fourth transistor 314, is connected to the positive feedback terminal 262 of the chopper operational amplifier 260, which is connected to the reference voltage RV. Further, NET3 is connected to NET 5 and NET 4 is connected NET6, which let the sixth transistor 360 be the output tube of the first differential amplifier 302 of the chopper operational amplifier 260. In this situation, the input offset voltage of the chopper operational amplifier 260 is defined as $V_{O1}$.

When the switching control signal is at the second state, all of the switches 321, 322, 323 and 324 are open, and all of the switches 325, 326, 327, and 328 are closed. In this situation, NET1, which is the gate electrode 336 of the third transistor 330, is connected to the positive feedback terminal 262 of the chopper operational amplifier 260, which is connected to the reference voltage RV. Further, NET2, which is the gate electrode of fourth transistor 314, is connected to the negative feedback terminal 264 of the chopper operational amplifier 260, which is connected to the source electrode 254 of transistor 250 the 250 in LED lighting system 200. Further, NET4 is connected to NET5 and NET3 is connected to NET 6, which let the fifth transistor 350 be the output tube of the first differential amplifier 302 of the chopper operational amplifier 260. In this situation, the input offset voltage of the chopper operational amplifier 260 is defined as $V_{O2}$.

The input offset voltage of the chopper operational amplifier 300 is mainly caused by the mismatch of the input transistor pair 304 including the third transistor 330 and the fourth transistor 340 and the current mirror transistor pair 306 including the fifth transistor 350 and the sixth transistor 360 of the first differential amplifier thereof. When the switching control signal is switched between the first state and the second state in the drive circuit according to the present invention, the electrical positions of the input transistor pair 304 are caused to switch between each other and the electrical positions of the current mirror transistor pair 306 are caused to switch between each other. Therefore, it can be concluded that:

$$V_{O1} = -V_{O2} \quad (3).$$

For the ith drive module, when the switching control signal is at the first state, the drive current $I_{LED\_i}$ of the ith LED 232$i$ in the ith drive module 242$i$ in drive circuit 240 can be calculated by equation (4):

$$I_{LED\_i} = (RV + V_{O1})/R_i \quad (4);$$

and when the switching control signal is at low level, the drive current on the ith drive module is:

$$I_{LED\_i} = (RV + V_{O2})/Ri \quad (5);$$

wherein i represents the ith drive module 242$i$, i=1, 2, . . . , n; $I_{LED\_i}$ represents the drive current of the ith LED 232$i$; $R_i$ represents the resistance value of the ith sampling resistor 290$i$. Since the switching control signal has a 50% duty cycle (DS), the average drive current $I_{LED\_i(ave)}$ of the ith LED in the ith drive module is:

$$I_{LED\_i(ave)} = \frac{.5DS(RV + V_{O1})}{R_i} + \frac{.5DS(RV + V_{O2})}{R_i} = \frac{RV}{R_i} \quad (6)$$

Equation (6) shows that the average drive current is only determined by the resistance value of the sampling resistor of the drive module and the reference voltage RV connected to the positive feedback input terminal of the chopper operational amplifier. Since the reference voltage RV input to all drive modules of the drive circuit are identical, the average drive current of the LED on each drive module is only determined by the resistance value of the sampling resistor of each drive module. Therefore, as long as a good matching accuracy is ensured for the sampling resistor of each drive module during the circuit design, the matching accuracy of the drive current of each LED in the drive circuit can be obtained.

Detailed description is provided above for a parallel LED drive circuit provided by the present invention. Embodiments are used herein to describe the principles and modes of carrying out the present invention, the above description of embodiments is only to help understand the methods and core thinking of the present invention; at the same time, those skilled in the art may modify modes of carrying out and application scope of the present invention according to the spirit thereof. In summary, the contents of the specification may not be construed as restrictive to the present invention.

In present invention, compared to the prior art, a chopper operational amplifier is used to take the place of the operational amplifier according to the prior art, and a switching control signal is used as the chopper control signal of the chopper operational amplifier.

The advantage of this invention is that the drive current of each LED is only determined by the reference voltage and the sampling resistor. When the switching control signal is switched between a first state and a second state, the polarity, positive or negative, of the input offset voltage of the chopper operational amplifier can be reversed, which results in the positive and negative input offset voltages of the chopper operational amplifier cancel each other and the effect of the input offset voltage of the operational amplifier eliminate; therefore.

What is claimed is:

1. A drive circuit configured to drive a parallel array of light emitting diodes (LEDs), the drive circuit comprising:
  a plurality of switches, each configured to be coupled to a respective LED in the parallel array of LEDs;
  a plurality of sampling resistors, each coupled to a respective switch in the plurality of switches and configured to receive a drive current when the respective switch is in a closed state;
  a plurality of chopper operational amplifiers, each chopper operational amplifier configured to receive a reference voltage at a positive feedback input terminal, a voltage taken across one of the plurality of sampling resistors at a negative feedback input terminal, and a switching control signal at a switching control signal terminal and generate an input offset voltage configured to control a respective switch in the plurality of switches using the reference voltage, the voltage taken across one of the plurality of sampling resistors, and the switching control signal, wherein each chopper operational amplifier includes a differential amplifier including an input transistor pair, a current mirror transistor pair, and a Miller compensation capacitor;

wherein the input transistor pair and current mirror transistor pair are mismatched, such that when the switching control signal is switched between a first state and a second state, electrical positions of the input transistor pair switch and electrical positions of the current mirror transistor pair switch to thereby cause a reversing of polarity of the input offset voltage of the chopper operational amplifier; and wherein:

when the switching signal is in the first state:

a first transistor in the current mirror transistor pair of each of the plurality of chopper operational amplifiers is connected to the Miller compensation capacitor of the respective chopper operational amplifier, the first transistor being an output tube of the respective chopper operational amplifier, and a gate terminal of the first transistor in the input transistor pair is connected to the positive feedback terminal, and when the switching signal is in the second state:

a second transistor in the current mirror transistor pair of each of the plurality of chopper operational amplifiers is connected to the Miller compensation capacitor of the corresponding chopper operational amplifier, the second transistor being the output tube of the respective chopper operational amplifier, and the gate terminal of the first transistor in the input transistor pair is connected to the negative feedback terminal.

2. The drive circuit of claim 1 wherein an average drive current ($I_{LED(average)}$) is determined by:

$$I_{LED(average)} = \frac{.5DS(RV + V_{O1})}{R} + \frac{.5DS(RV + V_{O2})}{R};$$

Wherein DS is the duty cycle, RV is the reference voltage, $V_{O1}$ is the input offset voltage when the switching control signal is in the first state, $V_{O2}$ is the input offset voltage when the switching control signal is in the second state, and R is a value of the sampling resistor.

3. The drive circuit of claim 2 wherein the switching control signal alternates between the first state and the second state.

4. The drive circuit of claim 3 wherein $V_{O1}$ and $V_{O2}$ are substantially equal.

5. The drive circuit of claim 4 wherein $$I_{LED(average)} = \frac{RV}{R}.$$

6. The drive circuit of claim 1 wherein a frequency of the switching control signal of switching between the first state and second state is greater than 50 Hz.

7. A parallel light emitting diode (LED) lighting system comprising:

a power source configured to drive the parallel LED lighting system;

an array of LEDs coupled together in parallel, each LED including an anode coupled to the power source to receive a drive current ($I_{LED}$) and a cathode;

a drive circuit having a plurality of sub-circuits each coupled to the cathode of a respective LED in the array of LEDs and comprising:

a sampling resistor having a value R;

a drive transistor having a drain, gate, and source, wherein the drain is connected to the respective LED through the cathode and the source is connected to a ground through the sampling resistor;

a chopper operational amplifier having an output terminal coupled to the gate of the drive transistor, a positive feedback input terminal connected to a reference voltage (RV), a negative feedback input terminal connected to the source of the drive transistor, and a control signal input terminal connected to a switching control signal, the chopper operational amplifier including:

a first transistor and a second transistor having a common gate connection connected to a gate electrode bias voltage and a common source connection connected to a working voltage;

a third transistor and a fourth transistor having a common source connection connected to a drain electrode of the first transistor;

a fifth transistor and a sixth transistor having drain electrodes connected to a drain of the third transistor and fourth transistor, respectively, and having a common gate electrode connection and a common source connection connected to ground;

a seventh transistor having a drain connected to a drain electrode of the second transistor and a source electrode connected to ground; and a Miller compensation capacitor connected between a drain electrode and a gate electrode of the seventh transistor; and wherein:

$$I_{LED} = \frac{RV}{R}.$$

when the control signal is in a first state, a gate of the seventh transistor is connected to a drain of the third transistor to make the fifth transistor an output tube of the chopper operational amplifier, and when the control signal is in a second state, the gate of the seventh transistor is connected to a drain of the fourth transistor to make the sixth transistor an output tube of the chopper operational amplifier.

8. The parallel LED lighting system of claim 7 wherein the switching control signal has a duty cycle of 50 percent.

9. The parallel LED lighting system of claim 7 wherein the chopper operational amplifier comprises a bias current mirror and a differential amplifier including an input transistor pair and a current mirror transistor pair forming the negative feedback input terminal and the positive feedback input terminal of the chopper operational amplifier.

10. The parallel LED lighting system of claim 9 wherein input transistor pair and a current mirror transistor pair have values selected such that, when the switching control signal is switched, electrical positions switch between the input transistor pair and electrical positions switch between the current mirror transistor pair.

11. The parallel LED lighting system of claim 7 wherein a frequency of the switching control signal is at least 50 Hz.

* * * * *